June 3, 1930.  J. H. ROBERTS  1,762,031
FRUIT CUTTER AND SQUEEZER
Filed Feb. 12, 1926
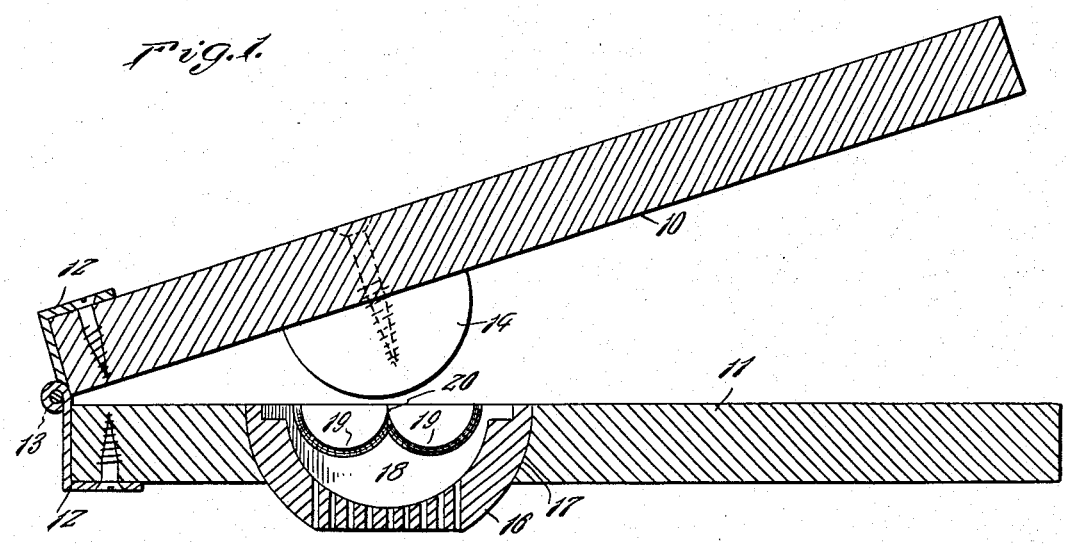
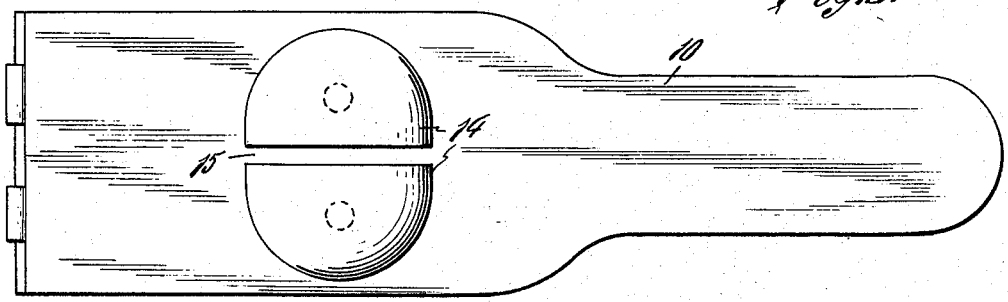
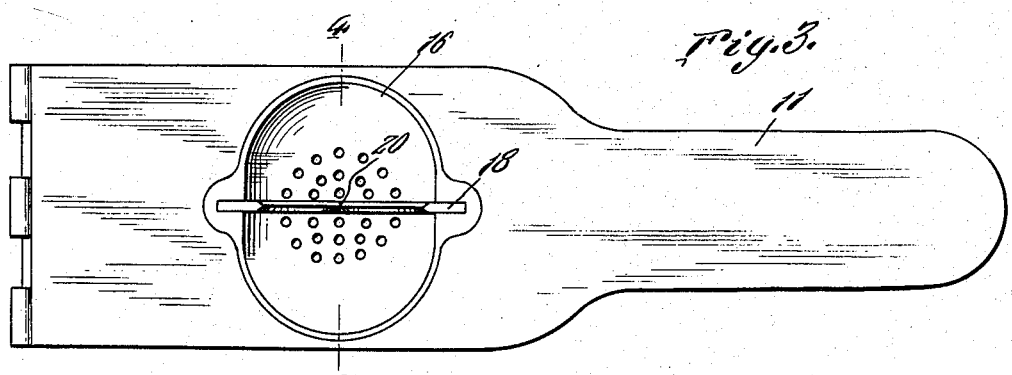
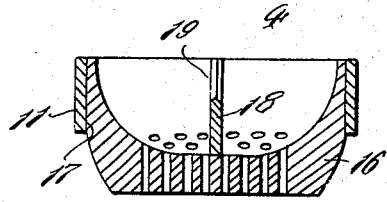
J. H. Roberts
INVENTOR
BY Victor J. Evans
ATTORNEY Patented June 3, 1930

1,762,031

UNITED STATES PATENT OFFICE

JAMES H. ROBERTS, OF ATLANTA, GEORGIA

FRUIT CUTTER AND SQUEEZER

Application filed February 12, 1926. Serial No. 87,891.

This invention relates to improvements in machines for simultaneously cutting and squeezing fruits in the manufacture of beverages.

An object of the invention is the provision of companion handles, one of which having a cup shaped reticulated receptacle including a longitudinally disposed upwardly extending cutter providing a pointed portion extending upwardly and centrally thereof upon which the fruit may be supported precedent to the application of companion spaced parallel plunger members secured upon the corresponding inner side of a companion hingedly secured handle whereby a downward pressure exercised by the plunger members will force the fruit downwardly and upon the knife for separating the latter in halves, and further downward pressure and squeezing tending to extract the juice from the fruit.

A cardinal object of the invention is to eliminate the usual necessity of cutting the fruit into halves some time prior to squeezing so that the beverage may be easily made but which becomes dry and flat. The invention overcoming this difficulty in providing the simultaneous operation of cutting and squeezing fresh fruits.

With the above and other objects in view, the invention further includes the following novel features and details of construction, to be hereinafter more fully described, illustrated in the accompanying drawings and pointed out in the appended claim.

In the drawing:—

Figure 1 is a longitudinal section of the invention.

Figures 2 and 3 are plan views of the handle members.

Figure 4 is a transverse section taken on line 4—4 of Figure 3.

Referring to the drawing in detail, wherein like characters of reference denote corresponding parts, the reference characters 10 and 11 indicate companion handle members, each of which have substantially L-shaped plates 12 secured to their forward ends and creating a hinged connection 13 between their meeting ends, as clearly illustrated in Figure 1 of the drawing. The under side of the handle member 10 has rounded semi-circular spaced parallel plunger members 14 supported thereon and defining a channel portion 15 between their intermeeting ends, the purpose of which will be presently apparent. The remaining and opposite handle member 11 fits a cup-shaped receptacle 16 within the correspondingly shaped opening 17 provided therein immediately beneath the plunger members 14. The bottom of the receptacle 16 is foraminated or reticulated while a longitudinally disposed blade 18 fitted within the receptacle 16 and having semi-circular and sharpened cutout portions 19 provided upon its upper edge and creating an upwardly extending pin or pointed portion 20 therebetween upon which a fruit may be pierced and held.

In the use and operation of the present invention it is clearly apparent and manifest that a desired species of fruit may be pushed downwardly upon and pierced by the projection 20 as a whole and cut in halves as is usually done which subjects the acid of the fruit to the atmosphere and which action causes the fruit to become dried and stale when not used immediately.

Subsequent to the placing and arrangement of the fruit upon the projection 20 of the plate 18 the plunger members 14 are then brought downwardly upon the fruit by a downward pressure exercised by the swinging movement of the handle member 10 and which action will cause the fruit, not shown, to be separated into halves and simultaneously in the same operation squeeze and extract the juice from the halves as cut whereby the juice from the fruit in its natural state may be extracted, mixed and served and prove more refreshing than if the fruit has been cut some time previous to squeezing or extracting the juice therefrom.

The invention is susceptible of various changes in its form, proportions and minor details of construction, and the right is herein reserved to make such changes as properly fall within the scope of the appended claim.

Having thus described the invention, what is claimed is:

A fruit cutter comprising a handle having a cup-shaped fruit receiving receptacle, a cutting blade centrally and vertically disposed within the receptacle, said blade having semi-circular sharpened edges arranged in end to end relation, and a pointed projection upstanding from the blade at the meeting of said edges for an appreciable distance above the latter to impale the fruit.

In testimony whereof I affix my signature.

JAMES H. ROBERTS.